March 20, 1934.  W. W. CARSON, JR  1,951,545
FEEDING DEVICE FOR STRIP MATERIALS
Filed Oct. 21, 1930
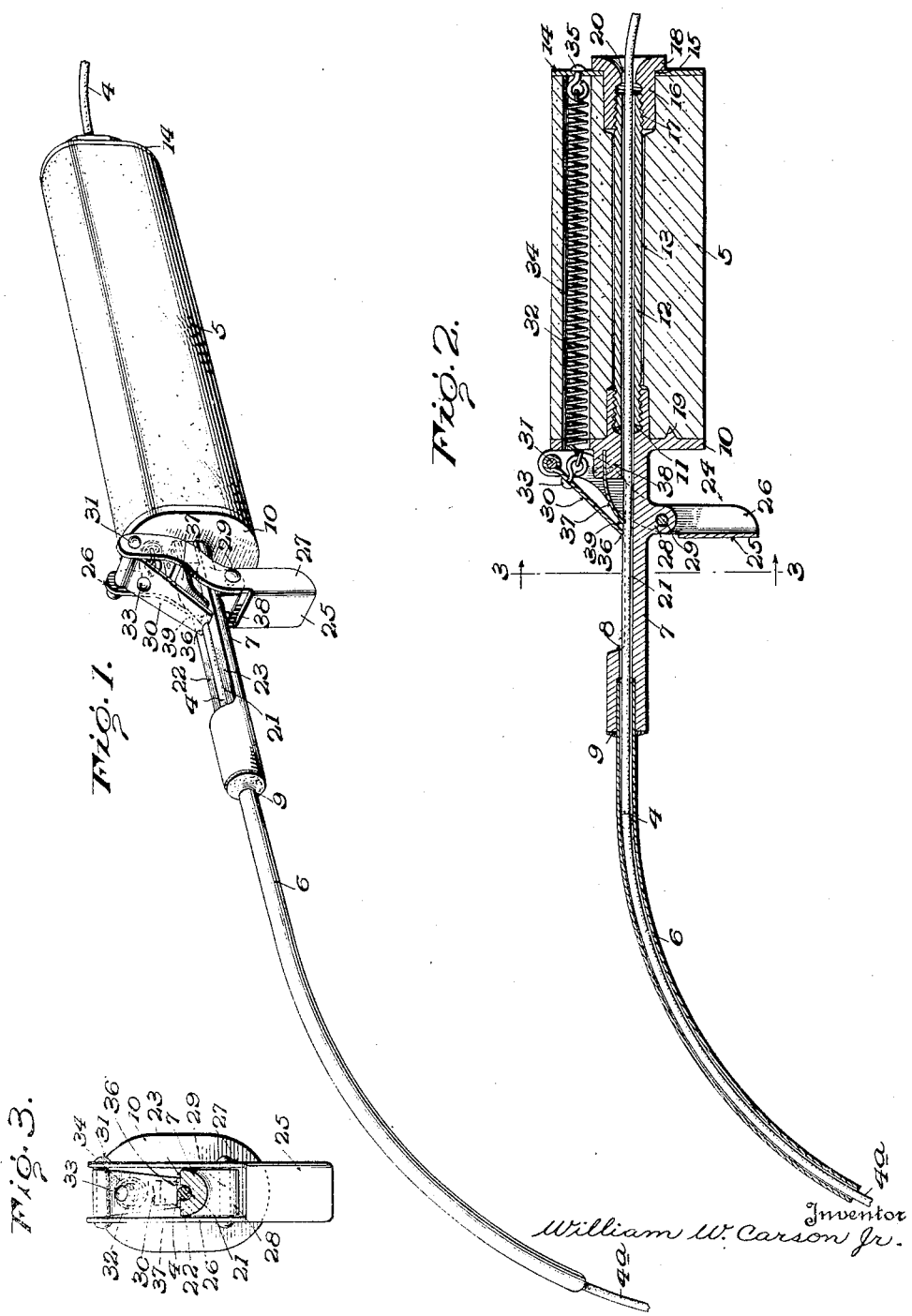
Inventor
William W. Carson Jr.
By Cameron, Kerkam & Sutton.
Attorneys Patented Mar. 20, 1934

1,951,545

UNITED STATES PATENT OFFICE 1,951,545

FEEDING DEVICE FOR STRIP MATERIALS

William W. Carson, Jr., Knoxville, Tenn., assignor to The Fulton Sylphon Company, Knoxville, Tenn., a corporation of Delaware Application October 21, 1930, Serial No. 490,320

9 Claims. (Cl. 113—111)

This invention relates to a device for holding and feeding a material strip and more particularly to a device for feeding solder through a holder in strip or wire form.

One of the objects of the present invention is to provide a novel mechanism for advancing a material strip through a holder.

Another object of the present invention is to provide a novel device for feeding strip material that may be held in one hand by an operator and is provided with a mechanism which may be actuated by a finger for moving the strip material through the device.

Another object of the present invention is to provide a novel device for feeding strip material that may be held in one hand by an operator and which has mechanism for gripping and holding the material strip at all times, and actuating means for advancing the material strip through the device.

Another object of the present invention is to provide a novel device for feeding a strip material that may be held in one hand by an operator and which is provided with mechanism for preventing the material strip from moving in but one direction, and actuating means for the mechanism which will successively advance the material strip in that direction.

Another object of the present invention is to provide a novel device for feeding strip material which is simple and compact in structure, easily manipulated and efficient for the purpose intended.

These and other objects will be more apparent from the following description and drawing in which like reference characters denote like parts throughout the several views. It is to be expressly understood, however, that the drawing is for the purpose of illustration only and does not define the limits of the invention, reference being had for this purpose to the appended claims.

In the drawing,

Fig. 1 is a perspective view of a preferred form of strip feeding device constituting the present invention;

Fig. 2 is a horizontal sectional view of the strip feeding device shown in Fig. 1; and Fig. 3 is a sectional view taken on line 3—3 of Fig. 2 to more clearly show the details of construction.

In the illustrated embodiment of the present invention, the device for holding, advancing and directing a material strip 4 comprises a hollow oval-shaped hand grip member 5 and a flexible directing tube 6. The grip member 5 and tube 6 are held in assembled relation in any suitable way, as by an intermediate member 7 provided with a bore 8 countersunk at one end as at 9 and an oval-shaped disk 10 at the other end. The flexible directing tube 6 is inserted in the countersunk bore 9 of the member 7 and rigidly secured thereto by any well known means such as soldering or welding. The oval-shaped disk 10 at the other end of the member 7 is provided with a centrally disposed aperture 11 in alignment with the bore 8 which is enlarged at its exterior end and interiorly threaded for receiving the threaded end of a tubular bushing 12 extending through the centrally located bore 13 in the grip member 5. An oval-shaped end plate 14 having an aperture 15 is provided at the other end of the grip member 5 and the entire structure is held in assembled relation in any suitable way as by means of a nut 16 having internal threads 17 for cooperation with the external threads on the other end of the tubular bushing 12. The nut 16 is provided with an annular shoulder 18 which engages the plate 14 about the aperture 15 and when tightly screwed onto the threaded end of the bushing 12 holds the plates 14 and 10 firmly in position at the ends of the grip member 5. Staking means such as illustrated at 19 are provided on the end plates for correctly positioning the plates relative to the grip member 5 and to prevent any relative rotation. A central bore 20 is made in the nut 16 of less diameter than the internal threads 19 for the purpose of receiving the material strip 4.

The intermediate connecting member 7 between its ends is cut away and may be provided with a groove 21 at its center in alignment with the bore 8 and aperture 11. Said member 7 also affords flat guiding surfaces 22 and 23 on either side of the groove. This groove 21 may be of a depth equal to about one-half of the diameter or thickness of the material strip 4 that is used. In the apparatus thus far described, the material strip 4 which may be in the form of a soft wire solder is inserted through the bore 20 of the nut 16, tubular bushing 12, aperture 11, bore 8 and flexible directing tube 6, and will lie in the groove 21 formed in the cutaway portion of the intermediate member with about half of its area exposed above the surface of the groove.

Intermediate the grip member 5 and directing tube 6 a novel mechanism has been provided for firmly gripping the material strip and advancing the same as needed, such as in the art of soldering. In the preferred form this mechanism includes an operating lever 24 having a handle or trigger part in the form of a channel with a back web 25 and side ribs 26 and 27, the back web 25 being shown as extending only a short distance to make the lever of rigid construction, leaving the side rib extensions 26 and 27 to constitute the greater part of the lever. These side ribs are pivotally mounted on a boss 28 formed on the intermediate member 7 by means of a pin 29 extending through the boss and the side ribs. The two extensions formed by the side ribs of the lever extend to the opposite side of the intermediate member from the handle and are offset beyond the pivot point so that in their normal position they abut against the end plate 10 of the intermediate member as a stop.

A pawl 30 is pivotally mounted between the lever extensions 26 and 27 by means of a pin 31 extending through one end of the pawl and the two side ribs adjacent their ends. The pawl is angularly disposed with respect to the intermediate member and is provided at its free end with a sharp edge 36 which rests on the surface of the strip 4 above the groove. The end of said pawl may be notched where it engages the strip material. The pawl is resiliently held in contact with the strip and in a retracted position by means of a spring 32 connected to the pawl at one end by an anchor bolt 33. This spring 32 extends through a bore 34 in the hand grip member 5 and is rigidly attached at its other end to the end plate 14 by means of an anchor bolt 35 rigidly fixed thereto.

A stationary pawl 37 of resilient material is mounted at one end on a boss 38 formed on the intermediate member 7 and is provided with a sharp edge 39 at its other end held in contact with the material strip by its natural resiliency. This boss 38 and pawl 37 are both positioned between the two side rib extensions 26 and 27 of the lever so that they do not interfere with the movement of the lever.

The operation of the device is as follows:—

A strip material such as soft solder 4 in wire form is taken from a reel or any suitable device and threaded through the aperture 20 of the nut 16, the bushing 12, the aperture 11, groove 21 and bore 8 of the intermediate member 7 and then through the directing tube 6. In the normal position of the operating mechanism the strip 4 will be gripped by the sharp edge of the pawl 30, held in contacting position by the spring 32 as shown in Fig. 2, and an operator holding the grip member 5 may easily direct the position of the extension 4a of the strip 4 at the end of the flexible tube 6.

When more of the strip material is needed the operator with one finger pulls the handle or trigger of the lever 24 causing the other ends opposite from the trigger to be moved to the left, as seen in Fig. 2, against the action of the spring 32. This movement of the lever extensions 26 and 27 moves the pawl 30 bodily to the left with it, and the sharp edge 36 contacting with the strip material 4 will cut into the material a slight amount causing it to grip and carry the material forward. The amount which the sharp edge 36 of the pawl will cut into the material is determined by the flat guide surfaces 22 and 23 on either side of the groove 21 and on which the edge of the pawl will slide. The carrying forward of the material strip 4 will force it through the flexible directing tube 6 and again extend the end 4a. During this operation the material strip 4 will slide under the edge of the stationary pawl 37. The operator then releases the handle and the lever returns to its normal position under the action of the spring 32 and the pawl 30 being inclined to the material strip with a trailing angle to the direction of movement will freely slide over the material strip 4 and into position to take a new grip or bite on the strip. To prevent any possible retracting movement of the strip during this time the stationary pawl 37 by its natural resiliency firmly holds the same until more material is needed and the lever again actuated.

As will be readily apparent a novel mechanism has been provided which may be easily manipulated for holding, directing and feeding strip material which is comfortable and easy to use, compact and simple in form and efficient for the purpose intended. Further, with a device constructed in accordance with the present invention, a material strip is held at all times from movement except in one direction which movement may be easily attained by merely operating the trigger or handle of the lever with one finger while holding the device in one hand. Although but one embodiment of the present invention has been shown and described in detail, it is to be understood that this embodiment is not exclusive, but various modifications may be made and certain features separately used without departing from the spirit of the invention. Reference is therefore to be had to the claims appended hereto for a definition of the scope of the invention.

What is claimed is:

1. In a feeding device for strip material, a holder for a material strip provided with a groove in which said strip is partially exposed and having a flat guiding surface laterally disposed with respect to said groove, a pivoted pawl angularly disposed with respect to the strip and adapted to cut into the strip when moved in one direction to grip the same but to release its grip and slide on the strip when moved in the opposite direction, said flat guiding surface cooperating with said pawl for limiting the amount of cut which may be made by the pawl, and means for moving the pawl.

2. In a feeding device for strip material, a holder for a material strip, a flat plate-like pawl pivoted at one end and provided with a sharp edge transverse to the strip at the other end, a resilient means for yieldingly holding the sharp edge in contact with the material strip, a lever pivoted on said holder and having a finger contacting portion at one side of said holder and said pawl mounted thereon at the opposite side of said holder, said lever moving the pawl in one direction to grip and advance the material strip, and said same resilient means moving the pawl in the opposite direction whereby the pawl will release the grip and the edge of the pawl will slip back on the surface of the material strip.

3. In a feeding device for strip material, a handle, a holder for a material strip extending from said handle, a lever pivotally mounted on the holder having a handle at one end and an operating extension at the other end, a pawl pivotally mounted on the operating extension of the lever, and a single spring extending within said handle for holding the pawl in a normally retracted position and in contact with the material strip.

4. In a feeding device for strip material, a hand grip member, a directing tube, means intermediate said hand grip member and tube for rigidly supporting and guiding the strip with the strip exposed, and means mounted on said last-named means for advancing the material strip comprising an operating lever, an angularly disposed pawl pivotally mounted on the lever, and a single spring for holding the pawl in contact with the strip and for retracting said lever and pawl.

5. In a feeding device for strip material, a hand grip member, a directing tube, a member intermediate said hand grip member and tube for connecting and holding the same in assembled relation, means for advancing the material strip comprising a lever pivoted to the intermediate member, and an angularly disposed pawl pivotally mounted on the lever which is adapted to grip and move the strip when the lever is rotated in one direction but release its grip and slide on the strip when the lever is rotated in the opposite direction.

6. In a feeding device for strip material, a hand grip member, a directing tube, a member intermediate said hand grip member and tube, said intermediate member being formed with a shallow groove, the hand grip member, tube and shallow groove of the intermediate member being adapted to receive the material strip so that part of its surface is exposed above the groove, and means on the intermediate member for advancing the material strip comprising a lever, a pawl pivoted to the lever, and a spring for holding the pawl in contact with the exposed surface of the strip.

7. In a feeding device for strip material, a hand grip member, a directing tube, a member intermediate the grip member and tube, said intermediate member having a cutaway portion with a central groove and flat guides on opposite sides of the groove, the grip member and tube being adapted to receive the material strip which lies in part in the groove, and means for moving the strip through the device comprising a pivoted pawl angularly disposed with respect to the strip for gripping and moving the strip when moved in one direction but releasing its grip and sliding on the strip when moved in the opposite direction.

8. In a feeding device for strip material, a hand grip member, a directing tube and a member intermediate said grip member and tube, said intermediate member being cut away for a part of its length and forming a groove and flat guideways on either side, the grip member, intermediate member and directing tube being adapted to receive the material strip which lies in part only in the groove formed in the intermediate member, and means for moving the strip through the device comprising an operating lever, a pawl pivotally mounted on the lever and angularly disposed with respect to the strip, and a resilient means for holding the pawl in contact with the material strip so that when the lever is operated in one direction the pawl will grip and advance the strip but when moved in the opposite direction will release its grip and slide on the strip.

9. In a feeding device for strip material, a hand grip member, a directing tube, a member intermediate the grip member and tube, said intermediate member being cut away intermediate its length and formed with a groove and directing guides on opposite sides, means for holding the material strip at all times and advancing the same when needed comprising an operating lever, a pawl pivotally mounted on the lever, a spring for holding the pawl in contact with the material strip, and a stationary pawl connected to the intermediate member whereby when the lever is operated in one direction the pawl will grip and advance the strip but when moved in the opposite direction will release its grip and slide on the strip, said stationary pawl preventing movement of the strip except in one direction.

WILLIAM W. CARSON, Jr.